(12) United States Patent
Maeda et al.

(10) Patent No.: US 7,282,867 B2
(45) Date of Patent: Oct. 16, 2007

(54) LIGHTING DEVICE FOR DISCHARGE LAMP

(75) Inventors: Syouhei Maeda, Yokosuka (JP); Yoshito Kato, Tottori (JP)

(73) Assignee: Harison Toshiba Lighting Corporation, Ehime (JP)

( * ) Notice: Subject to any disclaimer, the term of this patent is extended or adjusted under 35 U.S.C. 154(b) by 74 days.

(21) Appl. No.: 11/047,857

(22) Filed: Feb. 2, 2005

(65) Prior Publication Data
US 2005/0200303 A1 Sep. 15, 2005

(30) Foreign Application Priority Data
Mar. 1, 2004 (JP) ............................. 2004-055819
Jun. 10, 2004 (JP) ............................. 2004-172188

(51) Int. Cl.
*H05B 37/02* (2006.01)

(52) U.S. Cl. .................. 315/224; 315/276; 315/209 R

(58) Field of Classification Search ........ 315/224–225, 315/276, 209 R, 212
See application file for complete search history.

(56) References Cited

U.S. PATENT DOCUMENTS

| | | | |
|---|---|---|---|
| 6,081,075 A * | 6/2000 | Littlefield | 315/209 R |
| 2004/0113567 A1* | 6/2004 | Yamauchi et al. | 315/291 |
| 2004/0183380 A1* | 9/2004 | Otake | 307/82 |
| 2004/0183472 A1* | 9/2004 | Kamoi et al. | 315/291 |
| 2004/0251852 A1* | 12/2004 | Kambara et al. | 315/291 |
| 2005/0057181 A1* | 3/2005 | Izumi et al. | 315/209 R |

* cited by examiner

*Primary Examiner*—Trinh Vo Dinh
(74) *Attorney, Agent, or Firm*—Banner & Witcoff, Ltd.

(57) ABSTRACT

An inductor for performing a chopper operation by turning on or off a first switching element MOSFET Q1 and obtaining an increased voltage is arranged on the secondary side of a transformer 112 and on the basis of the turn ratio of the transformer 112, a high voltage at the time of stable lighting can be obtained from a DC power source 111 at a low voltage Vin. Further, when the on-duties of the first and second switching elements MOSFET Q1 and Q2 constituting an inverter circuit are made almost similar, the timings of application of the power to both ends of a lamp 144 can be made similar, so that the life span of the lamp can be improved.

2 Claims, 8 Drawing Sheets

LIGHTING DEVICE FOR DISCHARGE LAMP

CROSS-REFERENCE TO RELATED APPLICATION

This application is based upon and claims the benefit of priority from the prior Japanese Patent Application No. 2004-55819, filed on Mar. 1, 2004 and Japanese Patent Application No. 2004-172188, filed on Jun. 10, 2004, the entire contents of which are incorporated herein by reference.

BACKGROUND OF THE INVENTION (1) Field of the Invention

The present invention relates to a lighting device for a discharge lamp capable of lighting it at a low DC voltage.

(2) Description of the Related Art

A conventional power unit for a discharge lamp, for example, as disclosed in Japanese Patent laid-open publication No. 2001-128461, pages 7 and 8, FIGS. 1 to 3, shares a switching element constituting a bridge circuit and a chopper circuit for lighting a discharge lamp.

However, the aforementioned disclosed art, when a DC power source at a low voltage such as a battery is used, to obtain the voltage for lighting the lamp during the stable lighting period of the lamp, the duty ratio for turning on or off the switching element for the chopper must be changed, and a difference is caused in consumption of the lamp electrode, thus a problem arises that the life span of the lamp is reduced.

BRIEF SUMMARY OF THE INVENTION

An object of the present invention, even when a DC power source at a low voltage is used, is to provide a lighting device for a discharge lamp capable of obtaining a sufficient starting voltage and lengthening the life span of the lamp.

In an aspect of the present invention, an inductor for performing a chopper operation by turning on or off a first switching element MOSFET Q1 and obtaining an increased voltage is arranged on the secondary side of a transformer 112 and on the basis of the turn ratio of the transformer 112, a high voltage at the time of stable lighting can be obtained from a DC power source 111 at a low voltage Vin. Further, when the on-duties of the first and second switching elements MOSFET Q1 and Q2 constituting an inverter circuit are made almost similar, the timings of application of the power to both ends of a lamp 144 can be made similar, so that the life span of the lamp can be improved.

DETAILED DESCRIPTION OF THE INVENTION

Hereinafter, the lighting device for a discharge lamp of the embodiments of the present invention will be explained in detail with reference to the accompanying drawings.

<First Embodiment>

Figure 1:
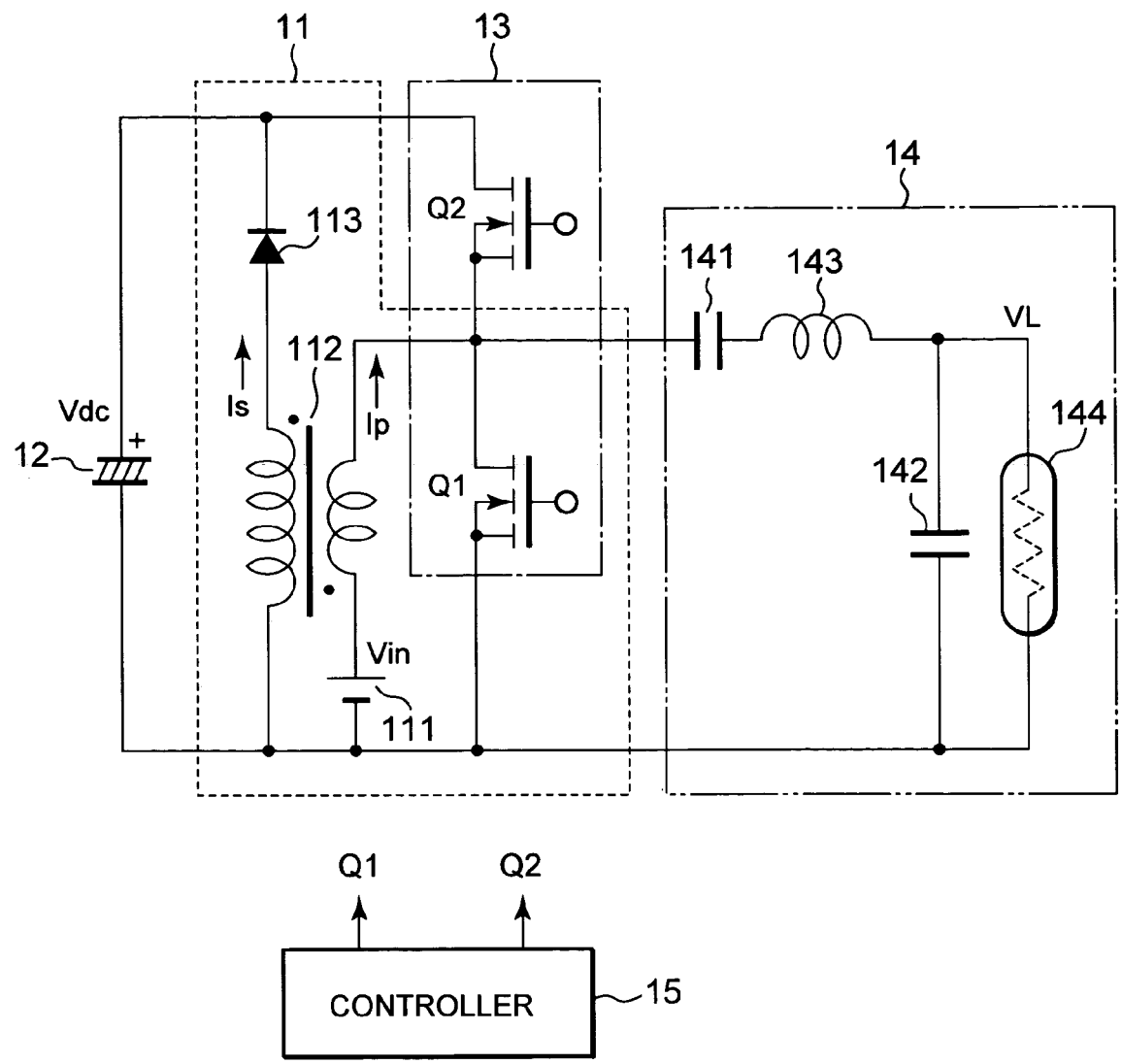
FIG. 1 is a circuit diagram for explaining the first embodiment of the present invention and FIG. 2 is a drawing for explaining the operation of the embodiment shown in FIG. 1.

FIG. 1 is a circuit diagram for explaining an embodiment of the present invention. Numeral 11 indicates a power conversion circuit and is composed of a DC power source 111, a transformer 112, a rectifier diode 113, and a MOS type field effect transistor (hereinafter, referred to as MOSFET) Q1 which is a first switching element. The positive terminal of the DC power source 111 whose negative terminal is grounded is connected to one end of a primary coil of the transformer 112 and the other end of the primary coil is grounded via the MOSFET Q1. One end of the secondary coil of the transformer 112 is grounded and the other end is connected to the drawn polarity and is grounded via the rectifier diode 113 and a smoothing capacitor 12.

The power conversion circuit 11 has a function for supplying the DC power Vin supplied from the DC power source 111, which is increased by the chopper according to the turn ratio of the transformer 112 by the on-off operation of the MOSFET Q1, to the smoothing capacitor 12.

Numeral 13 indicates an inverter circuit, which is composed of the first switching element MOSFET Q1 and the second switching element MOSFET Q2. The drain of the second switching element MOSFET Q2 is connected to the connection point of the rectifier diode 113 of the power conversion circuit 11 and the smoothing capacitor 12 and the source is connected to the drain of the first switching element MOSFET Q1. The MOSFET Q1 is used together with the power conversion circuit 11 and the first switching element MOSFET Q1 and the second switching element MOSFET Q2 are controlled by a control signal outputted from a controller 15.

Numeral 14 indicates a load circuit, which is composed of a DC cut capacitor 141, a resonance circuit of a capacitor 142 and a coil 143, and a lamp 144 such as a hot cathode discharge lamp, a cold cathode discharge lamp, or a metal halide lamp. One end of the capacitor 141 is connected to the other end of the transformer 112 and the other end of the capacitor 141 is connected to one end of the lamp 144 to which the capacitor 142 is connected in parallel via the coil 142. The other end of the lamp 144 is grounded.

Further, the load circuit 14 includes the resonance composed of the capacitor 142 and the inductor 143 and particularly, as shown in the drawing, when the inverter circuit 13 is a half bridge circuit, includes the DC cut capacitor 141.

Figure 2:
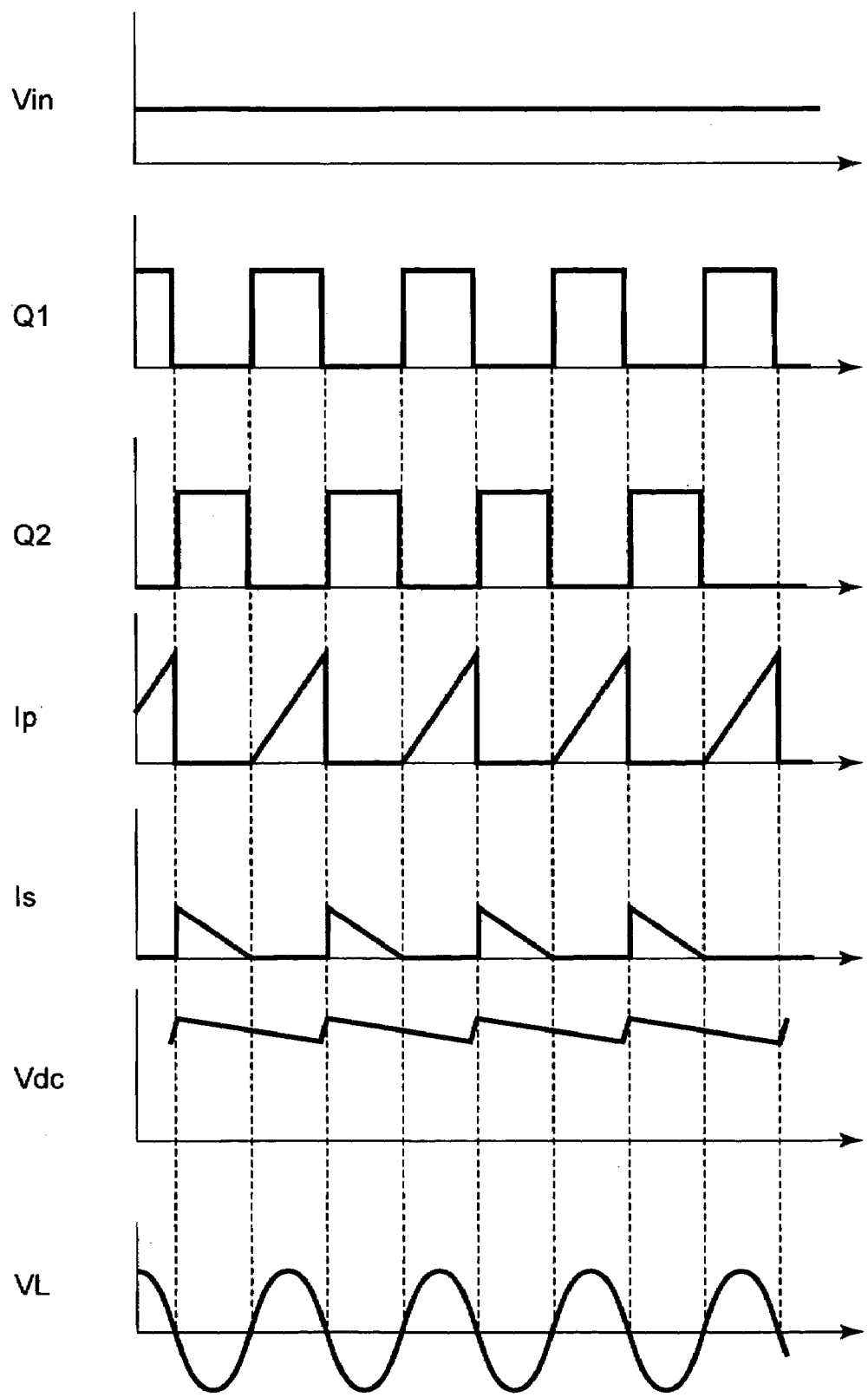

Next, the operation of the lighting device for a discharge lamp shown in FIG. 1 will be explained together with the waveform shown in FIG. 2. Firstly, the power conversion circuit 11 will be explained.

When a high-level control signal for turning on the MOSFET Q1 is supplied from the controller 15, the DC voltage Vin of the DC power source 111 is applied to the primary side of the transformer 112 and a current Ip flows from the MOSFET Q1 to the DC power source 111. At this time, on the secondary side of the transformer 112, a voltage according to the turn ratio is generated, though due to the operation of the rectifier diode 113, no current flows through the secondary side of the transformer 112. Namely, energy is accumulated in the transformer 112.

Next, when a low-level control signal for turning off the MOSFET Q1 is supplied from the controller 15, until a high-level control signal for turning on the MOSFET Q2 is supplied from the controller 15, a period during which both MOSFET Q1 and Q2 are turned off is generated. At this time, a current Is flows through the secondary side of the transformer 112, the diode 113, the smoothing capacitor 12, and the secondary side of the transformer 112 in this order, and the energy accumulated in the transformer 112 is supplied to the smoothing capacitor 12, and an electrical charge Vdc is accumulated. The power conversion circuit 11 operates as the so-called fly-back converter.

Then, the inverter circuit 13 will be explained.

The MOSFET Q2 is turned on, and a current flows through the smoothing capacitor 12, the load circuit 14, and the smoothing capacitor 12 in this order, and power is supplied to the lamp 144. Further, the residual energy of the transformer 112 which cannot be discharged by the first and second switching elements MOSFET Q1 and Q2 during the off period is supplied to the load circuit 14 during this period and is consumed here.

Next, when the second switching element MOSFET Q2 is turned off and the first switching element MOSFET Q1 is turned on again, by the regenerative current of the load circuit 14, a current flows through the load circuit 14, the MOSFET Q1, and the load circuit 14 in this order. When this process is repeated, AC power VL is generated in the lamp 144 of the load circuit 14 and the lamp 144 is lit by the AC power VL.

In this embodiment, the inductor for chopper voltage increase is used as a transformer, so that a voltage increased by the turn ratio of the transformer can be obtained. Therefore, even if the on-duties of the MOSFET Q1 and Q2 are almost the same, a high voltage can be obtained. Further, a voltage of an almost similar on-duty is supplied to the lamp electrode, so that it contributes to improvement of the life span of the lamp.

The capacitor 141 connected to the lamp 144 of the load circuit 14 in series may not be connected. However, when the capacitor is connected, the direct current is interrupted, and the waveform applied to the lamp 144 can be made a positive and negative symmetrical waveform, and the life span of the lamp can be lengthened more.

<Second Embodiment>

Figure 3:
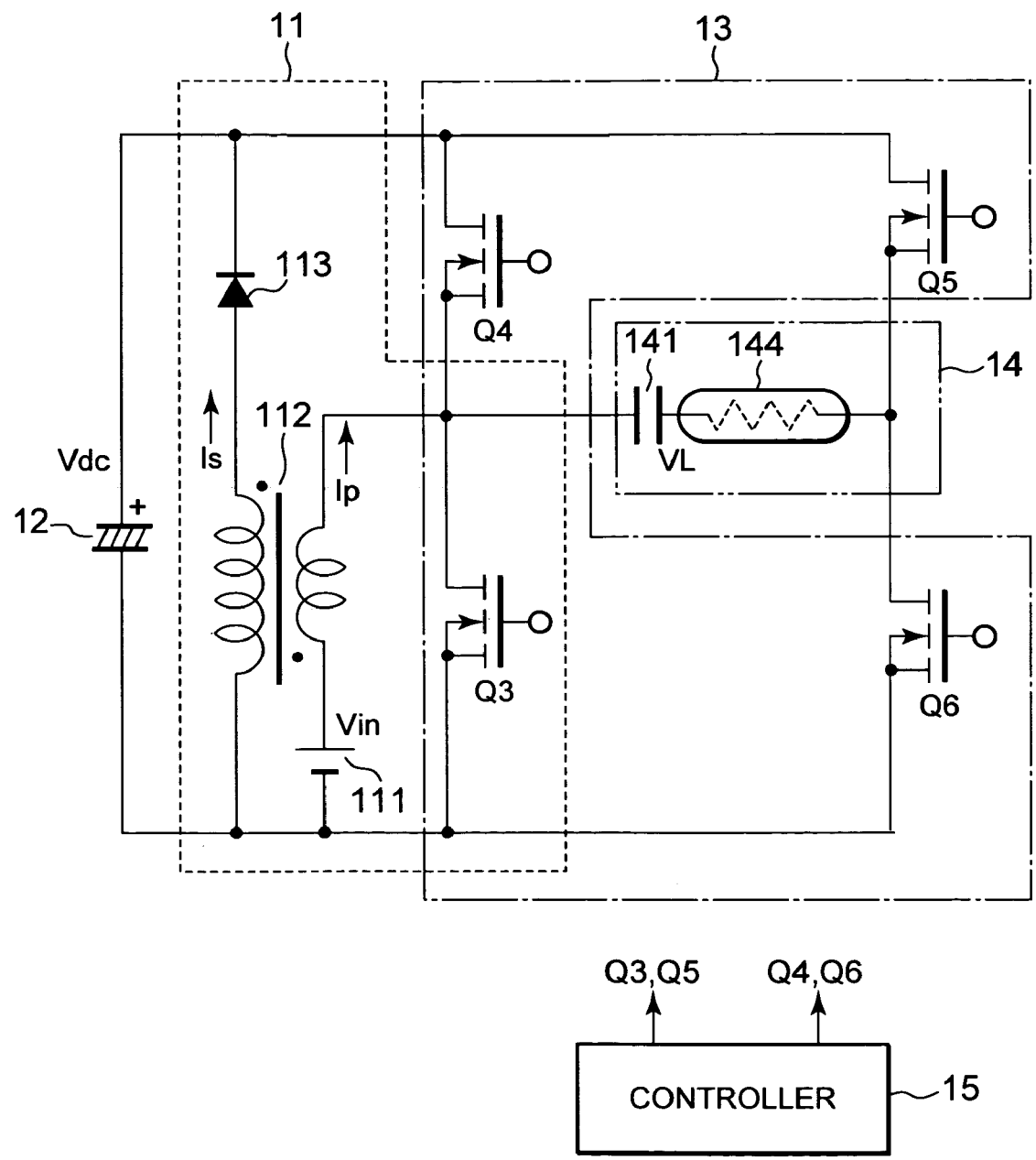
FIG. 3 is a circuit diagram for explaining the second embodiment of the present invention and FIG. 4 is a drawing for explaining the operation of the embodiment shown in FIG. 3.

FIG. 3 is a circuit constitution diagram for explaining another embodiment of the present invention. Further, the same components as those of the first embodiment are assigned the same numerals and explained. In this embodiment, the inverter circuit has the full bridge circuit constitution.

Namely, the inverter circuit 13 is composed of four switching elements MOSFET Q3 to Q6. The drains of the fourth switching element MOSFET Q4 and the fifth switching element MOSFET Q5 are connected, and the source of the fifth switching element MOSFET Q5 and the drain of the sixth switching element MOSFET Q6 are connected, and the sources of the sixth switching element MOSFET Q6 and the third switching element MOSFET Q3 are connected.

The load circuit 14 is composed of the DC cut capacitor 141 and the lamp 144. The other end of the capacitor 141 connected to the lamp 144 is connected to the connection point of the sort of the fourth switching element MOSFET Q4 and the drain of the third switching element MOSFET Q3. The other end of the lamp 144 is connected to the connection point of the sort of the fifth switching element MOSFET Q5 and the drain of the sixth switching element MOSFET Q6.

Figure 4:
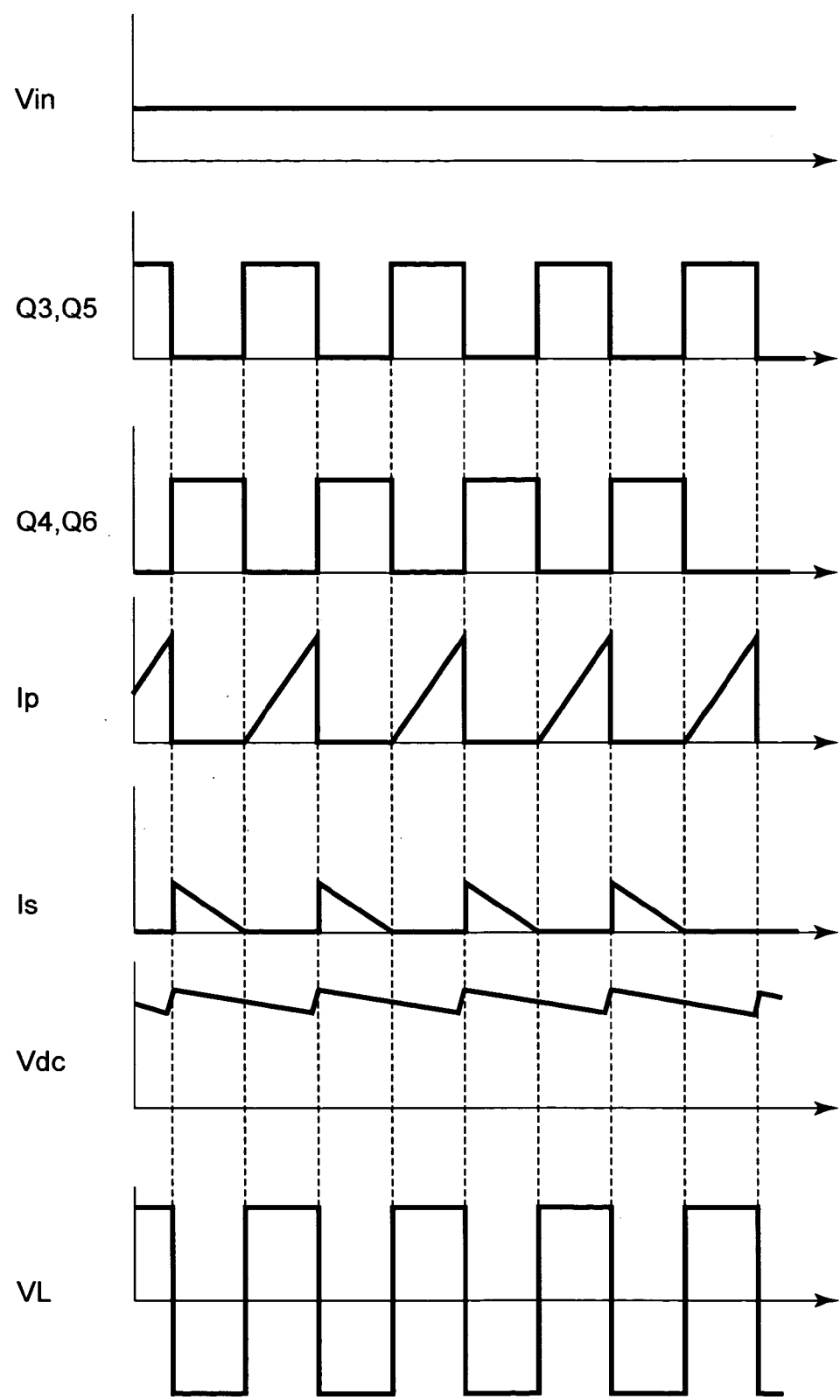

Next, the operation of the lighting device for a discharge lamp shown in FIG. 3 will be explained together with the waveform diagram shown in FIG. 4.

When a high-level control signal for turning on the third switching element MOSFET Q3 and the fifth switching element MOSFET Q5 is supplied from the controller 15, the DC voltage Vin of the DC power source 111 is applied to the primary side of the transformer 112 and the current Ip flows from the MOSFET Q3 and Q5 to the DC power source 111. At this time, on the secondary side of the transformer 112, a voltage according to the turn ratio is generated, though due to the operation of the rectifier diode 113, no current flows through the secondary side of the transformer 112. Namely, energy is accumulated in the transformer 112.

Next, when a low-level control signal for turning off the third switching element MOSFET Q3 and the fifth switching element MOSFET Q5 is supplied from the controller 15, until a high-level control signal for turning on the fourth switching element MOSFET Q4 and the sixth switching element MOSFET Q5 is supplied from the controller 15, a period during which both the third switching element MOSFET Q3 and the fourth switching element MOSFET Q4 are turned off is generated.

At this time, the current Is flows through the secondary side of the transformer 112, the diode 113, the smoothing capacitor 12, and the secondary side of the transformer 112 in this order, and the energy accumulated in the transformer 112 is supplied to the smoothing capacitor 12, and the electrical charge Vdc is accumulated in the capacitor. The power conversion circuit 11 operates as the so-called fly-back converter.

Then, an inverter circuit 131 will be explained.

The fourth switching element MOSFET Q4 and the sixth switching element MOSFET Q6 are turned on, and a current flows through the smoothing capacitor 12, the MOSFET Q4, the lamp 144, the MOSFET Q6, and the smoothing capacitor 12 in this order, and power is supplied to the lamp 144. Further, the residual energy of the transformer 112 which cannot be discharged by both the third switching elements MOSFET Q3 and the fourth switching element MOSFET Q4 during the off period is supplied to the load circuit 14 during this period and is consumed here.

Next, when the fourth switching element MOSFET Q4 and the sixth switching element MOSFET Q6 are turned off and the third switching element MOSFET Q3 and the fifth switching element MOSFET Q5 are turned on again, by the regenerative current of the load circuit 14, a current flows through the load circuit 14, the MOSFET Q3, and the load circuit 14 in this order. When this process is repeated, AC power VL is generated in the lamp 144 of the load circuit 14 and the lamp 144 is lit by the AC power VL.

As mentioned above, even if the inverter circuit has the full bridge constitution, the same effect as that of the aforementioned embodiment can be produced. Further, the capacitor 141 may not connected. However, when the capacitor 141 is connected, the lighting waveform can be prevented from being unbalanced vertically. When the waveform is unbalanced, one electrode is concentrated and the life span of the lamp is shortened. However, when the capacitor 141 is connected, there is an advantage that the life span of the lamp can be lengthened.

Further, in this embodiment, the AC power VL uses a square wave. However, if a sine wave is better depending on the kind of the lamp 144, when a coil is connected between the connection point of the sort of the fourth switching element MOSFET Q4 and the drain of the third switching element MOSFET Q3 and one end of the capacitor 141 and a capacitor is connected in parallel with the lamp 144, the lamp 144 can be driven by a sine wave.

The present invention is not limited to the aforementioned embodiment. For example, the third and fourth switching elements may use an insulated gate bipolar transistor (IGBT) instead of an MOSFET. Further, the inverter circuit 13 may have a function for converting the DC power supplied from the smoothing capacitor 12 to AC power by alternating turning on and off the third switching element MOSFET Q3 and the fourth switching element MOSFET Q4 and supplying it to the load circuit 14 on the latter stage and may share at least one switch with the power conversion circuit.

Further, when lighting the lamp 144 requiring a high voltage to start, an igniter can be connected when necessary. At this time, it is possible to add a winding to the transformer 112 of the power conversion circuit 11 to use it as a power supply source to the igniter.

<Third Embodiment>

Figure 5:
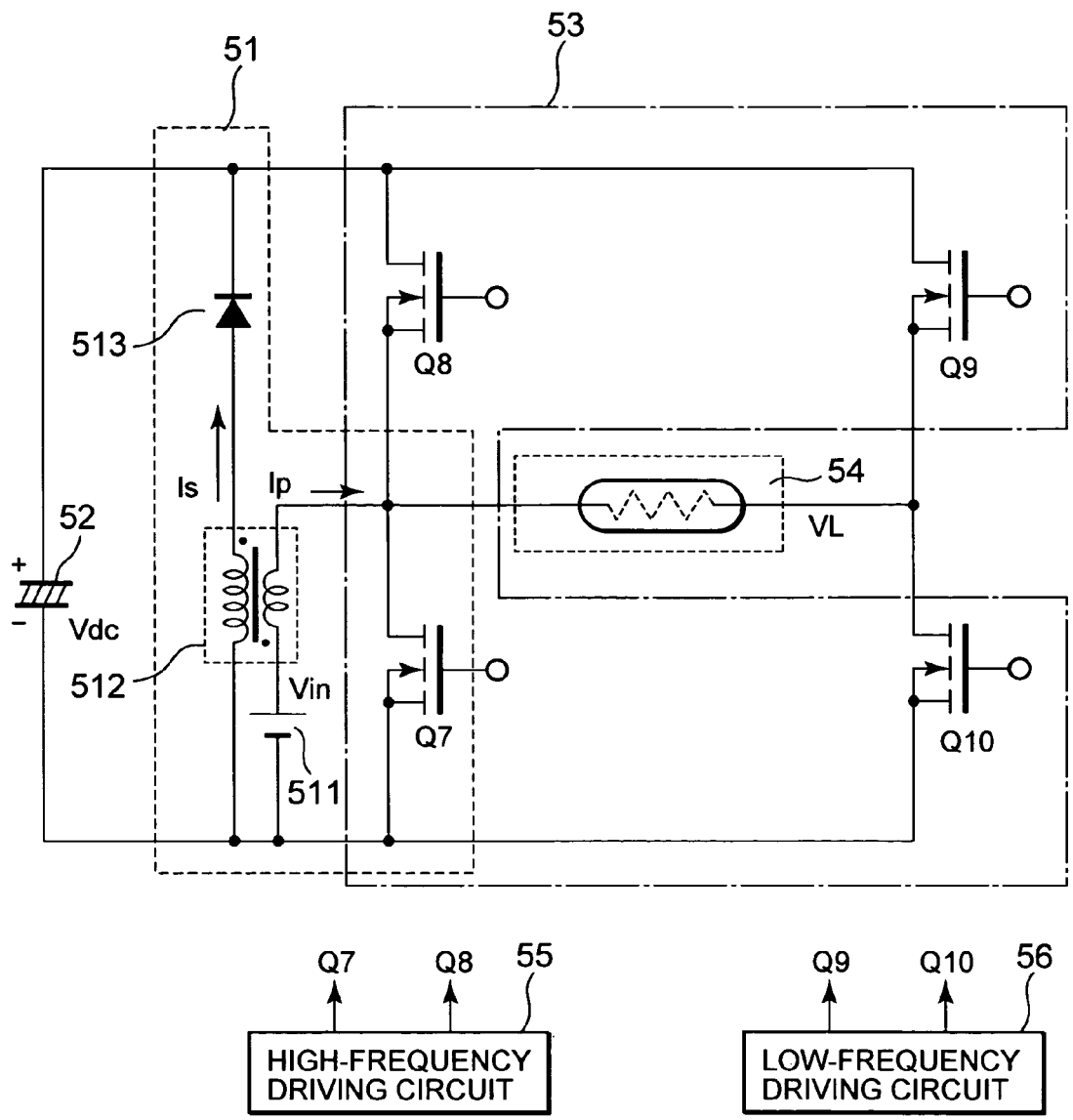
FIG. 5 is a drawing showing a constitution example of the lighting device for a discharge lamp of the third embodiment of the present invention and FIG. 6 is a drawing schematically showing the waveform of each unit of the lighting device for a discharge lamp of an embodiment of the present invention shown in FIG. 5.

FIG. 5 shows a circuit constitution diagram of the lighting device for a discharge lamp of the third embodiment of the present invention. The lighting device for a discharge lamp is composed of a power conversion circuit 51, a smoothing capacitor 52, an inverter circuit 53 sharing the power conversion circuit 51 and some parts, a load circuit 54 for lighting the lamp, a high-frequency driving circuit 55 for mutually turning on and off the seventh switching element MOSFET Q7 and the eighth switching element MOSFET Q8, which will be described later, by high frequency waves, and a low-frequency driving circuit 56 for mutually turning on and off the ninth switching element MOSFET Q9 and the tenth switching element MOSFET Q10, which will be described later, by low frequency waves.

The frequency of a control signal of the high-frequency driving circuit 55 is, for example, 45 kHz and the frequency of a control signal of the low-frequency driving circuit 56 is, for example, 100 Hz to 500 Hz.

The power conversion circuit 51 is composed of a DC power source 511, a transformer 512 for supplying the output power of the DC power source 511 to the primary side thereof, a rectifier diode 513 connected to the secondary side of the transformer 512 for rectifying induced AC power, and MOSFET Q7 connected to the DC power source 511 and the transformer 512 as a seventh switching element. The DC power source 511 is, for example, is set at 12 V.

The positive terminal of the DC power source 511 whose negative terminal is grounded is connected to one end of the primary coil of the transformer 512 and the other end of the primary coil is grounded via the seventh switching element MOSFET Q7. One end of the secondary coil of the transformer 512 is grounded, and the other end is connected to the anode terminal of the rectifier diode 513, and the cathode terminal thereof is connected to one end of the smoothing capacitor 52, and the other end of the smoothing capacitor 52 is grounded.

The power conversion circuit 51 has a function for supplying the DC power supplied from the DC power source 511, which is increased by the chopper according to the turn ratio of the transformer 512 by the on-off operation of the seventh switching element MOSFET Q7, to the smoothing capacitor 52.

The inverter circuit 53 is composed of the first switching element MOSFET Q1 mentioned above and the eighth, ninth, and tenth switching element MOSFET Q8, MOSFET Q9, and MOSFET Q10.

The seventh switching element MOSFET Q7 is connected to the eighth switching element MOSFET Q8 in series and the ninth switching element MOSFET Q9 is connected to the tenth switching element MOSFET Q10 in series. Namely, the drain of the seventh switching element MOSFET Q7 is connected to the source of the eighth switching element MOSFET Q8 and the drain of the tenth switching element MOSFET Q10 is connected to the source of the ninth switching element MOSFET Q9.

The drain of the eighth switching element MOSFET Q8 is connected to the connection point of the cathode of a rectifier diode 513 of the power conversion circuit 51 and the smoothing capacitor 52 and the source of the seventh switching element MOSFET Q7 is grounded. The source of the ninth switching element MOSFET Q9 is connected to the drain of the tenth switching element MOSFET Q10, and the drain of the ninth switching element MOSFET Q9 is connected to the drain of the eighth switching element MOSFET Q8, and the source of the tenth switching element MOSFET Q10 is grounded.

Between the connection point of the drain of the seventh switching element MOSFET Q7 and the source of the eighth switching element MOSFET Q8 and the connection point of the drain of the tenth switching element MOSFET Q10 and the source of the ninth switching element MOSFET Q9, the load circuit 54 is connected. The load circuit 54 is composed of the resonance circuit of the lamp such as a hot cathode discharge lamp, a cold cathode discharge lamp, or a metal halide lamp and the coil.

Next, by referring to the waveform diagram shown in FIG. 6 and the drawings showing the flow of current shown in FIGS. 7A to 7D, the operation of the lighting device for a discharge lamp will be explained.

The high-frequency driving circuit 55 turns on the seventh switching element MOSFET Q7. Then, a high-level control signal for turning on the seventh switching element MOSFET Q7 is supplied from the high-frequency driving circuit 55, thus the DC voltage Vin of the DC power source 511 is applied to the primary side of the transformer 512 and the current Ip flows from the MOSFET Q7 to the DC power source 511. At this time, on the secondary coil of the transformer 512, a voltage according to the turn ratio is generated, though due to the operation of the rectifier diode 513, no current flows through the secondary side of the transformer 512 and energy is accumulated in the transformer 512.

When the seventh switching element MOSFET Q7 and the ninth switching element MOSFET Q9 are also turned off, the energy is supplied to the smoothing capacitor 52 and the charge Vdc is accumulated. Namely, the power conversion circuit 51 operates as the so-called fly-back converter.

Then, the inverter circuit 53 will be described. When a high-level control signal is supplied to the ninth switching element MOSFET Q9 from the low-frequency driving circuit 56 and the MOSFET Q9 is turned on, since the seventh switching element MOSFET Q7 is turned on already, the energy accumulated in the smoothing capacitor 52, as shown in FIG. 7A, flows as a current through the load circuit 54.

Next, the seventh switching element MOSFET Q7 and the eighth switching element MOSFET Q8 are mutually turned on and off by the high-frequency driving circuit 55, so that there is a period during which the seventh switching element MOSFET Q7 enters the off state and the eighth switching element MOSFET Q8 is not turned on yet. In this state, as shown in FIG. 7B, no current flows.

Figure 7A:
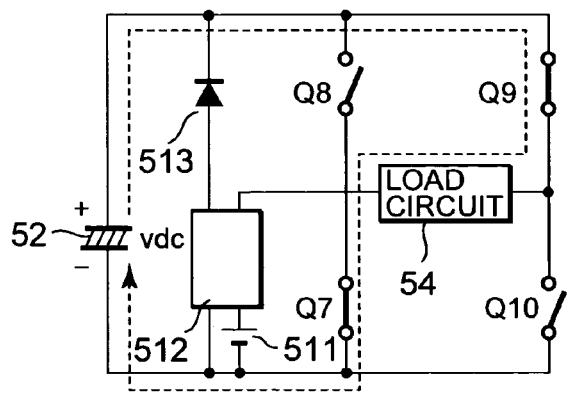
FIG. 7 is a drawing for explaining the operation of the lighting device for a discharge lamp of an embodiment of the present invention shown in FIG. 5.
Figure 7C:
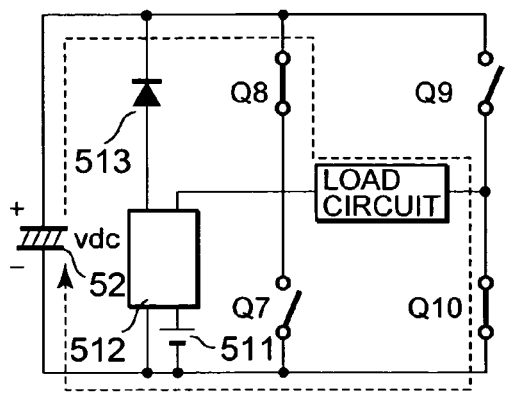

Next, when the eighth switching element MOSFET Q8 is turned on, as shown in FIG. 7C, a current flows through the smoothing capacitor 52, the MOSFET Q8, and the load circuit 54 in this order and power is supplied to the load circuit 54. The residual energy of the transformer 512 which is not discharged because both the seventh switching element MOSFET Q7 and the eighth switching element MOSFET Q8 are turned off is supplied to the load circuit 54 during this period and is consumed here.

Figure 7B:
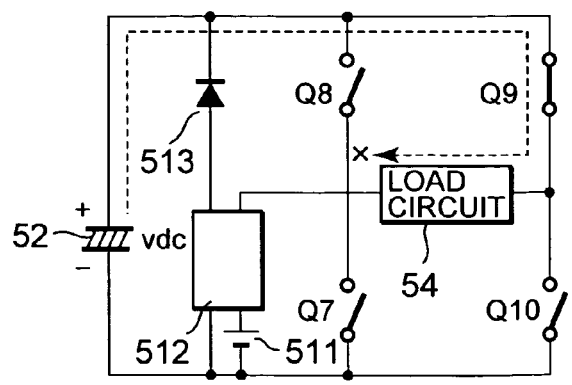

The seventh switching element MOSFET Q7 and the eighth switching element MOSFET Q8 are turned on or off at high speed compared with the ninth switching element MOSFET Q9 and the tenth switching element MOSFET Q10, so that in the state shown in FIG. 7B, both the seventh switching element MOSFET Q7 and the eighth switching element MOSFET Q8 pass through the off state, and as shown in FIG. 7A, the seventh switching element MOSFET Q7 is turned on, and the eighth switching element MOSFET Q8 is turned off.

At this time, in the load circuit 54, a current flows in the opposite direction of the direction of the current shown in FIG. 7B. After the states shown in FIGS. 7A and 7B are repeated several times like this, when the ninth switching element MOSFET Q9 enters the off state, and the tenth switching element MOSFET Q10 is turned on, and moreover the eighth switching element MOSFET Q8 is turned on, as shown in FIG. 7C, a current flows through the smoothing capacitor 52, the MOSFET Q8, the load circuit 54, and the MOSFET Q10 in this order.

Figure 7D:
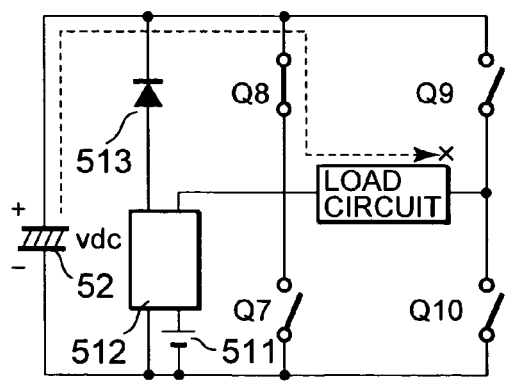

Further, as shown in FIG. 7D, even if the eighth switching element MOSFET Q8 is turned on, if the ninth switching element MOSFET Q9 and the tenth switching element MOSFET Q10 are kept off, no current flows naturally.

Figure 6:
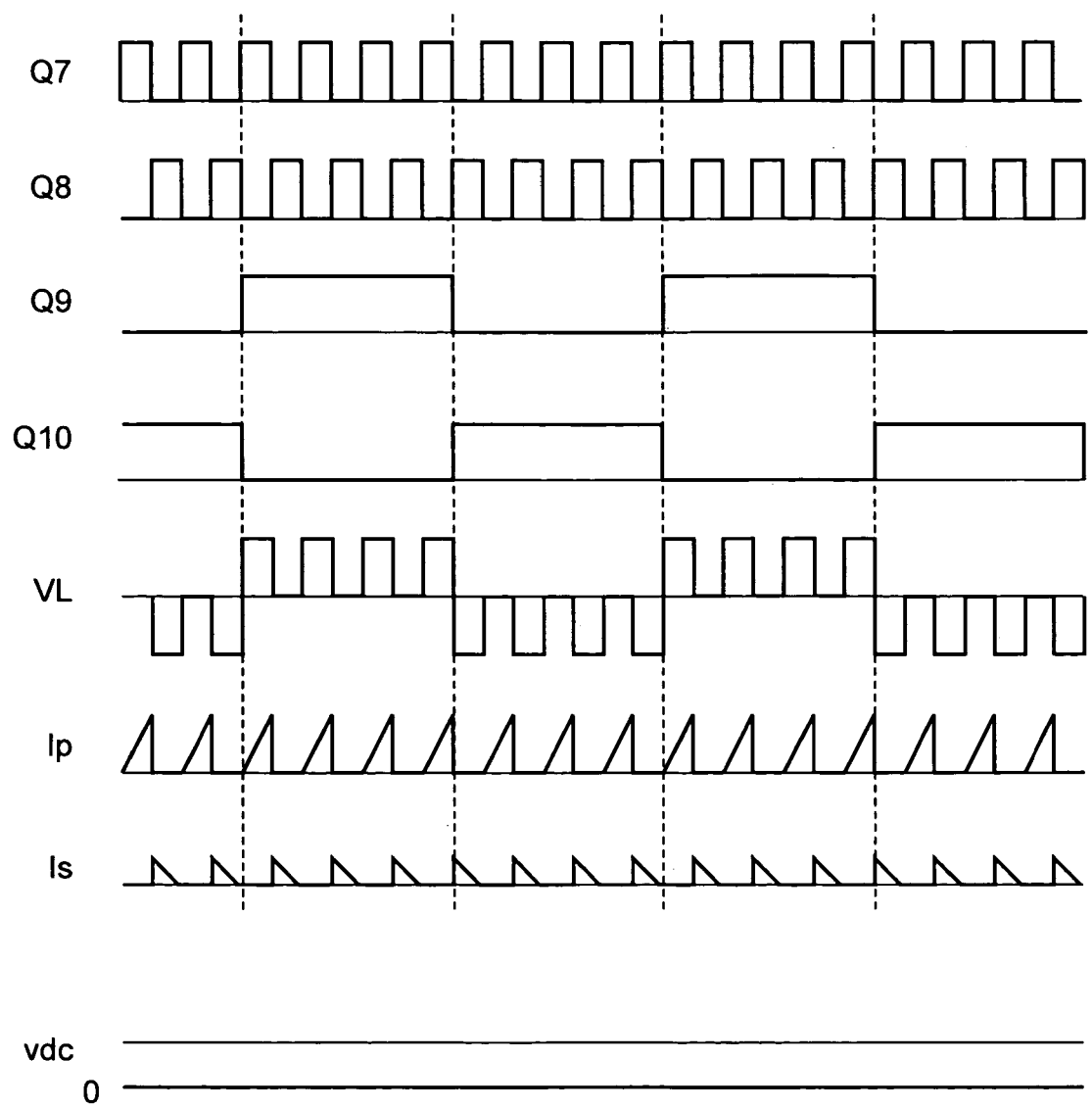

In FIG. 6 showing the waveform diagram like this, as shown in the switching elements Q7, Q8, Q9, and Q10 and the voltage VL, the current Ip, the current Is, and the voltage Vdc, for example, in the on timing of the seventh switching element MOSFET Q7, the current Ip flows at the DC voltage Vin, and the secondary current of the transformer 512 becomes Is, and the voltage of the smoothing capacitor 52 becomes Vdc, and to the load circuit 54, the voltage V1 is applied.

According to the third embodiment of the present invention, by the DC conversion circuit, the power at the DC voltage is accumulated and increased once in the smoothing capacitor, is converted to an alternating current by the inverter circuit, and is applied to the load circuit including the lamp. And, one of two pairs of MOSFETs constituting the inverter circuit is turned on or off by high frequency waves and the other is turned on or off by low frequency waves.

By doing this, the bridge circuit for lighting the discharge lamp and the chopper circuit for obtaining a sufficient starting voltage even at a low voltage are formed integrally with each other, thus there is an advantage that a lighting device for a discharge lamp which has no particular chopper circuit and can light the discharge lamp in a short time in a simple constitution can be obtained.

<Fourth Embodiment>

Meanwhile, in the embodiment shown in FIG. 5, to the connection point of the drain of the seventh switching element MOSFET Q7 and the source of the eighth switching element MOSFET Q8 and the connection point of the drain of the tenth switching element MOSFET Q10 and the source of the ninth switching element MOSFET Q9, the load circuit is connected directly.

Figure 8:
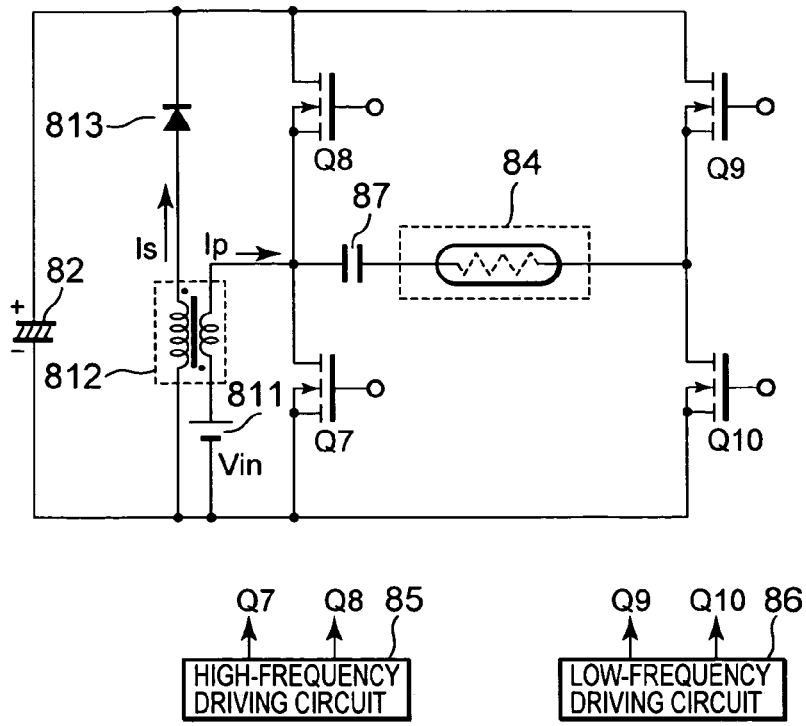
FIG. 8 is a drawing showing a constitution example of the lighting device for a discharge lamp of the fourth embodiment of the present invention and FIG. 9 is a drawing showing a constitution example of the lighting device for a discharge lamp of the fifth embodiment of the present invention.

However, as shown in FIG. 8, between a load circuit 84 and the connection point of the drain of the seventh switching element MOSFET Q7 and the source of the eighth switching element MOSFET Q8, a capacitor 87 can be connected in series with the load circuit 84. In FIG. 8, the numbers 811 to 86 respectively correspond to the numbers 511 to 56 shown in FIG. 5.

When the capacitor 87 is connected, the lighting waveform can be prevented from being unbalanced vertically. When the waveform is unbalanced, electric power is concentrated in one electrode and the life span of the lamp is shortened. On the other hand, when the capacitor 87 is connected, there is an advantage that the life span of the lamp can be lengthened.

<Fifth Embodiment>

Figure 9:
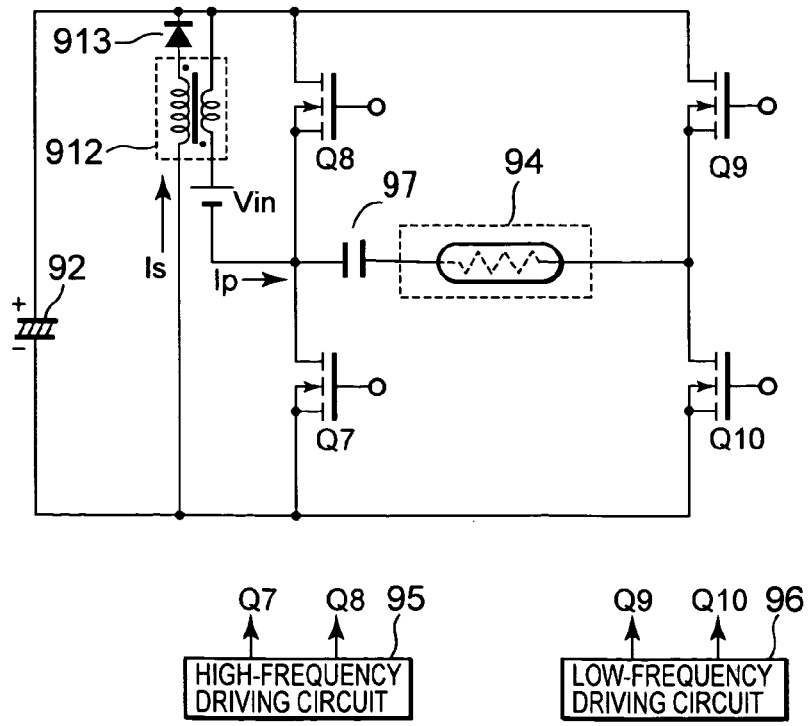

Further, in the embodiment shown in FIG. 5, the primary coil of the transformer 512 is connected to the seventh switching element MOSFET Q7 and it has a function of a chopper circuit. However, as shown in FIG. 9, it is possible to connect the eighth switching element MOSFET Q8 to the primary coil of a transformer 912, thereby provide the function of a chopper circuit. In FIG. 9, the numbers 911 to 96 respectively correspond to the numbers 511 to 56 shown in FIG. 5.

Also in this case, in the load circuit 94, a capacitor 97 for interrupting the direct current can be connected in series with the lamp.

Further, in all the aforementioned embodiments, the examples that the MOS type field effect transistors (MOSFET) are used in the inverter circuit are described. However, the present invention is not limited to MOSFET and switching elements such as IGBT may be used generally.

Obviously, many modifications and variations of this invention are possible in the light of the teachings. It is therefore to be understood that within the scope of the appended claims, this invention may be practiced otherwise than specifically described.

What is claimed is:

1. A lighting device for a discharge lamp, comprising:
   a DC power source;
   a power conversion circuit, on the basis of an on-off operation of a first switching element, for increasing to an increased voltage a voltage of said DC power source supplied to a primary side according to a turn ratio of a transformer, outputting said increased voltage to a secondary side, and rectifying said increased voltage;
   a smoothing capacitor for smoothing output of said power conversion circuit;
   an inverter circuit having said first switching element and a second switching element arranged for output of said power conversion circuit for converting DC power supplied from said smoothing capacitor to AC power by alternately turning on and off by said first and second switching elements; and
   a load circuit for lighting a lamp resonating with output of said inverter circuit,
   wherein the transformer includes a primary coil electrically coupled to the primary side and in a first direction and a secondary coil electrically coupled to the secondary side and wound in an opposing second direction.

2. A lighting device for a discharge lamp, comprising:
a DC power source;
a power conversion circuit, on the basis of an on-off operation of a first switching element, for increasing to an increased voltage a voltage of said DC power source supplied to a primary side according to a turn ratio of a transformer, outputting said increased voltage to a secondary side, and rectifying said increased voltage;
a smoothing capacitor for smoothing output of said power conversion circuit;
an inverter circuit having said first switching element and a second switching element arranged for output of said power conversion circuit for converting DC power supplied from said smoothing capacitor to AC power by alternately turning on and off by said first and second switching elements; and
a load circuit for lighting a lamp resonating with output of said inverter circuit,
wherein the transformer includes a primary coil electrically coupled to the primary side and a secondary coil electrically coupled to the secondary side, the lighting device further comprising a rectifier diode electrically coupled between the secondary coil and the smoothing capacitor.

* * * * *